(12) United States Patent
Pervan

(10) Patent No.: US 9,605,168 B2
(45) Date of Patent: Mar. 28, 2017

(54) DIGITAL PRINT WITH WATER-BASED INK

(71) Applicant: CERALOC INNOVATION AB, Viken (SE)

(72) Inventor: Darko Pervan, Viken (SE)

(73) Assignee: CERALOC INNOVATION AB, Viken (SE)

( * ) Notice: Subject to any disclaimer, the term of this patent is extended or adjusted under 35 U.S.C. 154(b) by 0 days.

(21) Appl. No.: 14/610,256

(22) Filed: Jan. 30, 2015

(65) Prior Publication Data

US 2015/0218395 A1  Aug. 6, 2015

(30) Foreign Application Priority Data

Jan. 31, 2014 (SE) ...................................... 1450103

(51) Int. Cl.
*B41J 2/21* (2006.01)
*C09D 11/107* (2014.01)
(Continued)

(52) U.S. Cl.
CPC .............. *C09D 11/107* (2013.01); *B41J 2/01* (2013.01); *B41J 2/2107* (2013.01); *C09D 11/322* (2013.01); *C09D 11/38* (2013.01)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 3,210,302 A  10/1965  Bowell
5,141,599 A   8/1992  Jahn et al.
(Continued)

FOREIGN PATENT DOCUMENTS

CN      101885200 A    11/2010
DE  10 2010 045 266 A   3/2012
(Continued)

OTHER PUBLICATIONS

U.S. Appl. No. 13/873,773, Melker Ryberg and Jan Jacobsson, filed Apr. 30, 2013.
(Continued)

*Primary Examiner* — Manish S Shah
(74) *Attorney, Agent, or Firm* — Buchanan Ingersoll & Rooney P.C.

(57) ABSTRACT

Water-based ink comprising a pigment mix and a method to form a digital print on a substrate with a pigment mix comprising large pigments and a Piezo ink head equipped with an ink circulation system, the method including: providing a water-based ink including an aqueous pigment mix including settling pigments, a binder including an acrylic resin dispersion, and a viscosity increasing substance including glycol and/or glycerine, providing a steric stabilization of the pigments and adapting the size of the pigments and the viscosity of the water-based ink such that a settling velocity of the pigments exceeds about 0.001 mm/min at 25° C., circulating said water-based ink within said at least one Piezo print head, and printing a digital image with said at least one Piezo print head by applying ink drops of said water-based ink on the substrate.

30 Claims, 5 Drawing Sheets

(51) Int. Cl.
*B41J 2/01* (2006.01)
*C09D 11/322* (2014.01)
*C09D 11/38* (2014.01)

(58) Field of Classification Search
CPC .... B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC .................................................. 347/95–105
See application file for complete search history.

(56) References Cited

U.S. PATENT DOCUMENTS

| | | | |
|---|---|---|---|
| 5,486,231 | A | 1/1996 | Dulaney |
| 5,989,701 | A * | 11/1999 | Goetzen .................. B41M 5/52 428/315.9 |
| 6,087,416 | A | 7/2000 | Pearlstine et al. |
| 6,310,115 | B1 | 10/2001 | Vanmaele et al. |
| 6,565,919 | B1 | 5/2003 | Hansson |
| 6,585,369 | B1 | 7/2003 | Sievert et al. |
| 6,800,340 | B1 | 10/2004 | Francescutti |
| 2002/0061389 | A1 | 5/2002 | Brooker et al. |
| 2003/0207083 | A1 | 11/2003 | Hansson et al. |
| 2004/0061753 | A1 | 4/2004 | Chen |
| 2004/0191547 | A1 | 9/2004 | Oldorff |
| 2004/0250911 | A1 | 12/2004 | Vogel |
| 2005/0193677 | A1 | 9/2005 | Vogel |
| 2005/0249929 | A1 | 11/2005 | Reichwein et al. |
| 2007/0058018 | A1* | 3/2007 | Ishibashi .............. C09D 11/101 347/101 |
| 2007/0193174 | A1 | 8/2007 | Vogel |
| 2007/0224438 | A1 | 9/2007 | Van Benthem et al. |
| 2008/0048388 | A1 | 2/2008 | Gauss et al. |
| 2008/0152825 | A1 | 6/2008 | Mukai et al. |
| 2008/0152877 | A1 | 6/2008 | Mukai |
| 2008/0176039 | A1 | 7/2008 | Chen et al. |
| 2008/0252709 | A1 | 10/2008 | Ushiku |
| 2010/0091058 | A1 | 4/2010 | Hale et al. |
| 2010/0196678 | A1 | 8/2010 | Vermeulen |
| 2010/0300030 | A1 | 12/2010 | Pervan et al. |
| 2010/0307675 | A1 | 12/2010 | Buhlmann |
| 2010/0323187 | A1 | 12/2010 | Kalwa |
| 2011/0135815 | A1 | 6/2011 | Ganapathiappan et al. |
| 2011/0177354 | A1 | 7/2011 | Ziegler et al. |
| 2011/0180202 | A1 | 7/2011 | Hirst et al. |
| 2011/0189448 | A1 | 8/2011 | Lindgren et al. |
| 2011/0234727 | A1 | 9/2011 | Aoki et al. |
| 2011/0247748 | A1 | 10/2011 | Pervan et al. |
| 2011/0250404 | A1 | 10/2011 | Pervan et al. |
| 2011/0303113 | A1 | 12/2011 | Sarkisian et al. |
| 2012/0015107 | A1 | 1/2012 | Schacht et al. |
| 2012/0113193 | A1 | 5/2012 | Yamashita |
| 2012/0147108 | A1 | 6/2012 | Ganapathiappan et al. |
| 2012/0169808 | A1 | 7/2012 | Kiyomoto et al. |
| 2012/0178844 | A1 | 7/2012 | Frey et al. |
| 2012/0249705 | A1* | 10/2012 | Aoki ...................... C09D 11/322 347/102 |
| 2012/0288689 | A1 | 11/2012 | Hansson et al. |
| 2013/0063528 | A1 | 3/2013 | Govyadinov |
| 2013/0286088 | A1 | 10/2013 | Jacobsson |
| 2014/0017452 | A1 | 1/2014 | Pervan |
| 2014/0028772 | A1 | 1/2014 | Pervan |
| 2014/0144583 | A1 | 5/2014 | Hakansson et al. |
| 2014/0186610 | A1 | 7/2014 | Pervan |
| 2014/0198168 | A1 | 7/2014 | Pervan et al. |
| 2015/0210055 | A1 | 7/2015 | Pervan |

FOREIGN PATENT DOCUMENTS

| | | |
|---|---|---|
| EP | 1 328 407 | 5/2002 |
| EP | 1 242 702 A1 | 9/2002 |
| EP | 1 314 766 A1 | 5/2003 |
| EP | 1 403 343 A1 | 3/2004 |
| EP | 1 454 763 A2 | 9/2004 |
| EP | 1 242 702 B1 | 11/2004 |
| EP | 1 577 354 A2 | 9/2005 |
| EP | 1 577 354 A3 | 9/2005 |
| EP | 1 584 378 A1 | 10/2005 |
| EP | 1 328 407 B1 | 8/2008 |
| EP | 1 980 598 A1 | 10/2008 |
| EP | 1 454 763 B1 | 8/2009 |
| EP | 2 202 056 A1 | 6/2010 |
| EP | 2 213 476 A1 | 8/2010 |
| EP | 2 264 259 A2 | 12/2010 |
| EP | EP 2 313 281 A1 | 4/2011 |
| EP | 2 313 281 B1 | 7/2012 |
| JP | 2006-281538 A | 10/2006 |
| JP | 2008-265229 A | 11/2008 |
| WO | WO 01/19618 A1 | 3/2001 |
| WO | WO 01/47717 A1 | 7/2001 |
| WO | WO 01/48333 A1 | 7/2001 |
| WO | WO 01/53387 A1 | 7/2001 |
| WO | WO 02/42087 A2 | 5/2002 |
| WO | WO 02/42087 A3 | 5/2002 |
| WO | WO 2004/042168 A1 | 5/2004 |
| WO | WO 2005/097874 A2 | 10/2005 |
| WO | WO 2006/001880 A2 | 1/2006 |
| WO | WO 2006/106931 A1 | 10/2006 |
| WO | WO 2007/015669 A2 | 2/2007 |
| WO | WO 2009/018260 A1 | 2/2009 |
| WO | WO 2009/065769 A2 | 5/2009 |
| WO | WO 2009/065769 A3 | 5/2009 |
| WO | WO 2009/080813 A1 | 7/2009 |
| WO | WO 2009/097986 A1 | 8/2009 |
| WO | WO 2009/124704 A1 | 10/2009 |
| WO | WO 2010/084386 A2 | 7/2010 |
| WO | WO 2010/084386 A3 | 7/2010 |
| WO | WO 2011/020755 A1 | 2/2011 |
| WO | WO 2011/087422 A1 | 7/2011 |
| WO | WO 2011/087423 A1 | 7/2011 |
| WO | WO 2011/103641 A1 | 9/2011 |
| WO | WO 2011/141849 A2 | 11/2011 |
| WO | WO 2011/141849 A3 | 11/2011 |
| WO | WO 2011/146149 A1 | 11/2011 |
| WO | WO 2012/004701 A2 | 1/2012 |
| WO | WO 2013/032387 A1 | 3/2013 |
| WO | WO 2014/011110 A1 | 1/2014 |
| WO | WO 2014/027179 A1 | 2/2014 |
| WO | WO 2014/084787 A1 | 6/2014 |

OTHER PUBLICATIONS

U.S. Appl. No. 14/091,957, Niclas Hakansson, Jan Jacobsson, Marcus Berglin, Rickard Rittinge, Melker Ryberg, and Jan Jacobsson, filed Nov. 27, 2013.
U.S. Appl. No. 14/237,617, Darko Pervan, filed Feb. 7, 2014.
U.S. Appl. No. 14/602,581, Darko Pervan, filed Jan. 22, 2015.
U.S. Appl. No. 14/602,581, filed Jan. 22, 2015, Pervan.
Pervan, Darko, U.S. Appl. No. 14/602,581 entitled "Digital Print with Water-Based Ink on Panel Surfaces," filed in the U.S. Patent and Trademark Office Jan. 22, 2015.
U.S. Appl. No. 15/028,873, filed Apr. 12, 2016, Pervan.
Pervan, Darko, et al., Technical Disclosure entitled Digital Printing and Embossing, IP.com No. IPCOM000224950D, IP.com PriorArtDatabase, Jan. 15, 2013, 89 pages.
Pervan, Darko, Technical Disclosure entitled "Digital Overlay," IP.com No. IPCOM000225271D, IP.com PriorArtDatabase, Feb. 5, 2013, 24 pages.
Pervan, Darko, U.S. Appl. No. 15/028,873 entitled "Method of Forming a Decorative Wear Resistant Layer," filed in the U.S. Patent and Trademark office on Apr. 12, 2016.

(56) References Cited

OTHER PUBLICATIONS

International Search Report issued in corresponding PCT/SE2015/050109, May 19, 2015, ISA/SE, Stockholm, SE, 5 pages.

* cited by examiner

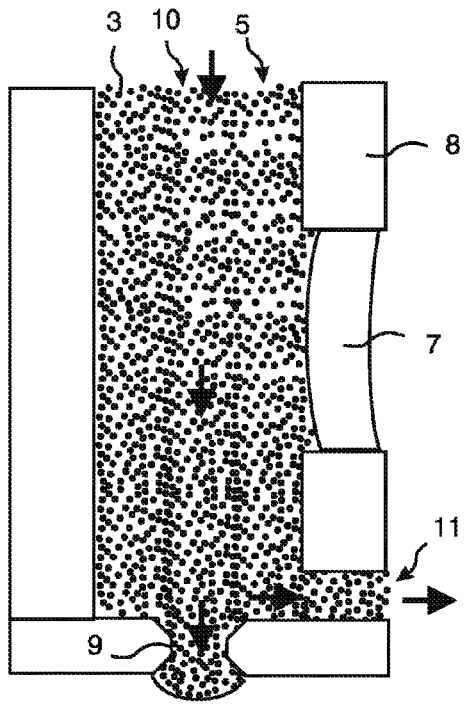
Fig. 4a
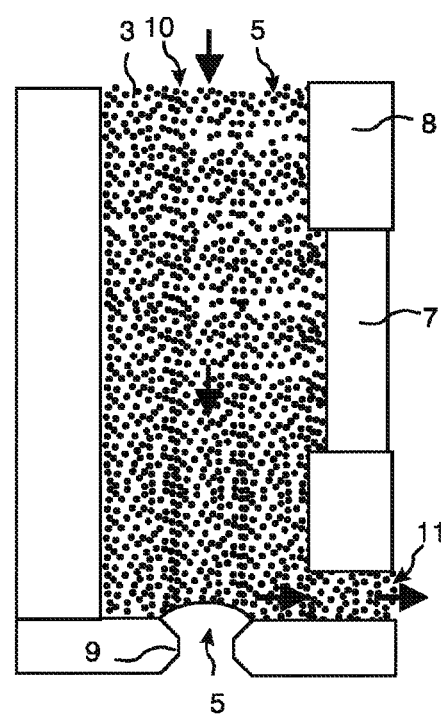
Fig. 4b
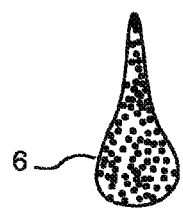
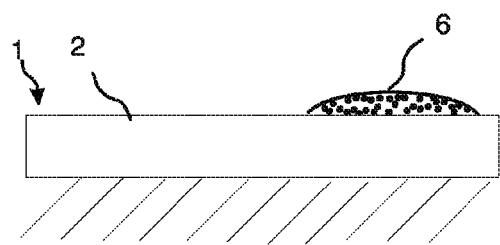

DIGITAL PRINT WITH WATER-BASED INK

CROSS REFERENCE TO RELATED APPLICATIONS

The present application claims the benefit of Swedish Application No. 1450103-5, filed on Jan. 31, 2014. The entire contents of Swedish Application No. 1450103-5 are hereby incorporated herein by reference in their entirety.

TECHNICAL FIELD

The disclosure generally relates to the field of digital printing on panel surfaces with Piezo print heads and water-based ink comprising a pigment mix with large pigments.

FIELD OF APPLICATION

Embodiments of the present disclosure are particularly suitable for use in floors, which are formed of floor panels comprising a core, a decorative layer, and preferably a transparent wear resistant structured layer above the decorative layer. Preferred embodiments are thermoplastic based LVT (Luxury Vinyl Tiles) and WPC (Wood Plastic Composite) floors, laminate floors and powder-based floors. The following description of techniques, problems of known technology and objects and features of the disclosure will therefore, as a non-restrictive example, be aimed above all at this field of application and in particular at floorings with a surface comprising thermosetting resins and with a wood or stone design.

It should be emphasized that embodiments of the disclosure may be used to produce a digital image on any surface, for example, paper, wood and textile surfaces, but flat panels such as, for example, building panels in general, wall panels, ceiling panels, furniture components and similar products that generally have large surfaces with advanced decorative patterns are preferred. The basic principles of embodiments of the disclosure may be used to apply a digital print on ceramic tiles, carpets, wood, paper, linoleum, and cork floors.

BACKGROUND

The following description is used to describe the background and products, materials and production methods that may comprise specific parts of preferred embodiments in the disclosure of this disclosure.
a) Laminate Floors The majority of all laminate floors have a wood design. Such laminated floors have a core of 6-12 mm fibreboard, a 0.2 mm thick upper decorative surface layer of laminate and a 0.1-0.2 mm thick lower balancing layer. The decorative and wear properties are generally obtained with two separate layers of melamine formaldehyde impregnated paper, one above the other. The decorative layer is a printed paper and the wear layer is a transparent overlay paper, which comprises small aluminium oxide particles. The décor may be made with digital printing provided that a high quality pigment dispersion with small pigments is used.
b) Powder Based Floors Recently new "paper free" floor types have been developed with solid surfaces comprising a substantially homogenous powder mix of fibres, binders and wear resistant particles hereafter referred to as WFF (Wood Fibre Floor).

The powder mix may comprise aluminium oxide particles, melamine formaldehyde resins and wood fibres. In most applications decorative particles such as, for example, colour pigments are included in the mix. In general, all these materials are applied in dry form as a mixed powder on a HDF core and cured under similar heat and pressure as used in laminate floors. Digital powder printing has been developed and it is possible to create very advanced wood, stone and tile designs by injecting water base ink into the powder prior to pressing. Such digital printing with water-based ink comprising pigment requires a high quality ink comprising very small pigments since rather small drops must be applied into the powder of in order to avoid bleeding during pressing when the melamine formaldehyde resin of the WFF floor surface floats.
c) LVT Floors Luxury Vinyl Tiles, generally referred to as LVT floorings, are constructed as a layered product made of thermoplastic polyvinyl chloride (PVC) mixed with plasticizers. The name LVT is somewhat misleading since a major part of LVT floors have a plank shape with a wood pattern.

Thermal moulding based on calendar rolling or extrusion is used to form the PVC layers. The core is made primarily of several layers that comprise PVC mixed with chalk and/or limestone fillers. A 0.1 mm high quality printed decorative PVC foil is applied on the upper side of the core. A transparent wear layer of vinyl with a thickness of 0.1-0.6 mm is generally applied on the decorative foil. The base layer, the decorative foil and the transparent layer are fused or laminated together with heat and pressure in continuous or discontinuous press operations. A transparent UV curing polyurethane (PU) lacquer is generally applied as a protective layer on the transparent PVC foil.

The decorative effects are obtained with a decorative foil that is printed separately and fused on the core layers. The foil comprises a single colour that generally is white and covers the dark colour of the core. The foil provides a base colour for the rotogravure printing process where special solvent-based inks are used to create wood, tile and stone designs.
d) WPC Floors Wood Plastic Composite floors, generally referred to as WPC floors, are similar to LVT floors. The core comprises thermoplastic material mixed with wood fibre fillers and is generally stronger and much more rigid than the mineral-based LVT core. A printed image is protected by a transparent foil or a UV-curable lacquer in the same way as in LVT floors.

Thermoplastic material such as polyvinyl chloride (PVC), polypropylene (PP) or polyethylene (PE) may be combined with a mix of wood fibres and mineral particles and this may provide a wide variety of floor panels with different densities and flexibilities.

Some flooring producers have started to use digital printing technology to increase production flexibility and high quality prints of wood, tile and stone designs have been produced with expensive high quality inks comprising very small pigments. However, digital printing is only on an experimental stage and only small volumes are produced. The main reasons are that essentially the same printing technology and inks are used as in conventional desk top printing and the digital printing is not cost competitive compared to conventional printing technology based on large scale rotogravure printing.

DEFINITION OF SOME TERMS

In the following text, the visible surface of the installed floor panel is called "front side", while the opposite side of the floor panel, facing the sub floor, is called "rear side".

By "up" is meant towards the front side and by "down" towards the rear side. By "vertically" is meant perpendicular to the surface and by "horizontally" parallel to the surface.

By "digital printing" is meant a digitally controlled ejection of drops of fluid that is used to position colorants in pre-defined patterns onto a surface.

Known Technique and Problems Thereof

The general technologies, which are used by the industry to provide a digital print is described below. The methods may be used partly or completely in various combinations with preferred embodiments of the disclosure in order to create a digital print according to embodiments of this disclosure.

High definition digital ink jet printers use a non-impact printing process. The printer has print heads that "fire" drops of ink from the print head to the surface in a very precise manner.

Industrial printers are generally based on a Single Pass Printing method, generally referred to as "flatbed" printing, which uses several fixed print heads aligned side by side in several rows that cover the width of the printed media. In general each row of print heads prints one colour. The printed surface moves under the heads. Such printers have a high capacity and are generally custom made for specific applications. Recently piezo print heads with several channels have been developed and one print head may print several colours.

The print is generally based on the CMYK colour principle where the white colour is provided by the surface. This is a 4-color setup comprising cyan, magenta, yellow and black. Mixing these colours together with small drops applied in a raster pattern will give the required colour gamut. Spot colours may be added that are applied in a raster pattern side by side in order to form a colour gamut in the same way as the 4-colour CMYK principle. A spot colour may be any colour. A spot colour is any colour generated by an ink (pure or mixed) that is printed using a single run. By spot colour is in this disclosure meant a spot colour other than cyan, magenta, yellow and key (black). Spot colours are especially suitable to print copies of natural material such as wood and stone materials. However, spot colours are very expensive since they are generally custom-made in small quantities and must be adapted to a large colour range that is needed to print wood and stone designs. Generally, one specific row of print heads or channels is needed to print a specific spot colour since it is very time consuming and expensive to change the ink in a print head or a channel. Spot colours in a raster pattern must be very small since larger drops may cause pigment bleeding during lamination and the décor may be destroyed.

A suitable print head has to be used in order to obtain a high printing quality and speed. A print head has several small nozzles that can shoot and apply droplets of inks in a controlled way in a raster pattern.

Most commercial and industrial inkjet printers use the Piezoelectric print head technology. A piezoelectric crystal material (generally called Piezo) in an ink-filled chamber behind each nozzle is used to eject ink drops. When a voltage is applied, the piezoelectric material changes shape, which generates a pressure pulse in the fluid forcing a droplet of ink from the nozzle. Piezo print heads allows a wide variety of inks and are able to handle high viscosity ink. Piezo print heads are by several producers classified as small, medium and large print heads depending on the nozzle and drop size. A small print head may have a nozzle opening with a diameter of about 20 micron and may fire drops of 10-20 picoliters. Medium and large print heads have nozzle opening within the range of 30-40 microns and may fire drops of 20-100 picoliters. Cps or mPa·s is generally used to define the viscosity of ink-jet inks. One cps is equal to one mPa·s. Piezo print heads may handle inks with a viscosity of a few cps to more than 50 cps. Recently, industrial flat bed printers have been developed with an ink circulation system reducing the risk that the ink dries in the nozzle opening when the print head is not active.

The ink is the most crucial part of the digital printing technology. The ink must be adapted to the receiving surface, to the specific print head and to the quality requirements of the printed surface. In addition, several other crucial parts must be considered in flooring applications, for example, the fact that the print must be protected by a strong wear layer and that the printed image generally is exposed to high heat and pressure after printing when the digital image is incorporated into a floor panel. A special problem occurs when a digital print is applied on surfaces comprising thermosetting resins that float during lamination and that cause the pigment to float or bleed such that the original image is changed and eventually destroyed.

A lot of ink types may be used. The main components are colorants that provide the colour, a binder that bonds the colorants to the surface and a liquid carrier that transfers the colorant and the binder from the print head in well-defined small drops to a surface with a non-contact application method.

The most commonly used ink types are classified depending on the main carrier fluid that is used. The main classes are: solvent-based inks, UV curing inks, oil based inks and water-based inks.

The main ingredient of solvent-based inks is a mixture of solvents that is used as a carrier fluid. Pigments are bonded to a surface when the solvents evaporate.

UV-curable inks do not evaporate. They cure by exposure to strong UV-light. A chemical reaction takes place where the photo-initiators cause the ink components to cross-link into a solid substance. UV curable inks are used in almost all digital printing of laminate floors.

Oil-based inks use a very slow drying carrier fluid that is usually derived from a mineral oil. They are mainly used on porous surfaces, such as on dry pressed tile surfaces that are able to quickly absorb the oil-based carrier fluid applied onto the media base leaving the colorant on the surface.

Water-based inks have many advantages. They are environmental friendly, cost competitive and may provide a high quality printing method in many different materials. The water-based carrier fluid comprises binders that provide the adhesion of the colorants to a surface. A commonly used binder is water-based acrylic dispersion. Generally, a viscosity increasing substance is included, for example, glycol or glycerine, which is needed to reach the viscosity and surface tension of the liquid substance for a proper function of a print head.

The colorant is either a dye or pigment or a combination of both. Pigment inks are generally more light stable, especially when exposed to UV light, and more fade resistant than dye-based inks. They are therefore used in almost all flooring applications.

Aqueous pigment based ink-jet ink suspensions comprise about 30 wt % (weight) pigment dispersion and about 70 wt % of binders and viscosity increasing substances. The pigment dispersion may comprise 3-10 wt % of pigments. The inks are very expensive mainly due to high cost for the pigment dispersion. Pigments behave as sand in water and settles. Highly advanced and expensive technology must be used to produce a stable pigment dispersion comprising small pigments in order to prevent the small pigment particles to agglomerate and to keep the pigments in a stable floating stage in a liquid carrier during a long time, generally several months. Production of stable pigment dispersions and ink-jet ink suspensions is a complex process clearly differentiated from a much simpler pigment mixing method that cannot provide a stable water-based ink-jet ink and that is not used in conventional water-based digital printing inks, especially not in inks that are used to provide a digital image on a surface of a building panel, especially a floor panel comprising a thermosetting resin and a décor with a wood or stone design.

The dispersion of pigments to produce stable water-based ink suspension comprises generally three main steps. The first step is pigment wetting where all of the air between the pigments is replaced by a resin solution. The second step is grinding where the pigment agglomerates are broken up and disrupted in several milling steps into smaller units and dispersed. The particle size is stepwise reduced from the normal pigment diameter of 300-800 nm to much smaller particles with an average diameter of about 100 nm and with a particle diameter variation between 50-200 nm. The third step is stabilization of the pigment dispersion. Stabilization is achieved through absorption of stabilizing molecules on the pigment so that repulsive forces prevent other particles from approaching. There are two main principal mechanisms for the stabilization of pigmented dispersions. Electrostatic stabilization occurs when two particles having the same charges give a repelling effect. One manner of providing steric stabilization occurs when the solid particles are completely covered by polymers. Strong interactions between polymers and solvents prevent the polymers from coming too closely into contact with one another. Aqueous and stable pigment dispersions are in the final production steps mixed with binders and viscosity increasing substances in order to produce the final ink suspension that is used in the print head.

It would be a major advantage if the complicated and costly method to produce stable aqueous pigment dispersions comprising small pigments may be avoided especially in water-based inks that are intended to be used to provide a digital print in flooring application where large amounts of pigments are needed to cover the colour of the core material and to produce high quality copies of a wood or stone design.

The above description of various known aspects is the applicant's characterization of such, and is not an admission that the above description is prior art when the various technologies are used partly or completely in various combinations.

OBJECTS AND SUMMARY

The main objective of at least certain embodiments of the disclosure is to provide a pigment based aqueous ink suspension and a digital printing method that may be used without costly and high quality pigment dispersions.

A first specific objective is to provide an aqueous ink suspension comprising pigments with large average size and a wide particle distribution that may be used to provide a print on a panel, especially on floor panels that after printing are cured under high heat and pressure and that preferably may comprise a thermosetting resin in the surface layer.

A second specific objective is to provide spot colours that may be used as individual colours with overlapping large ink drop to form base colours or surface portions of a décor that is a copy of natural materials, for example, wood and stone material.

A basic principle of an embodiment of the disclosure is to increase the average size of the pigments and the size distribution of a dispersion such that no costly milling of the pigments is needed as in aqueous conventional ink used in flooring application.

Embodiments of the disclosure are based on a first main principle wherein a stable dispersion of very small pigments is replaced by a pigment mix comprising larger soft-settling pigments in a high viscosity liquid that may be applied with a print head comprising large nozzle openings and an ink circulation system that keeps the pigments floating in the ink during printing in spite of the fact that sedimentation may take place over time. Such inks may be used to provide a digital cost efficient print on panel surfaces and other types of surfaces and especially on surfaces with a wood or stone design.

Embodiments of the disclosure are based on a second main principle wherein a stable dispersion of very small pigments is replaced by a pigment mix comprising larger pigments with an average diameter of 200-500 nm and with a pigment diameter variation for at least 90% of the pigments between 100-1000 nm that is stabilized by means of a steric stabilization and that may be applied with a print head comprising a large nozzle opening. Such inks may be used to provide a digital cost efficient print on panel surfaces and other types of surfaces and especially on surfaces with a wood or stone design that may be formed partly or completely with spot colours comprising large overlapping ink drops.

Embodiments of the disclosure are based on a third main principle wherein a water-based ink is provided, which may sediment one or several times, which ink after sedimentation resume to its original structure and pigment distribution by stirring the ink. By stirring after sedimentation, the ink may resume to its original pigment distribution and preferably have an average diameter of about 200-500 nm and a diameter variation of at least 90% of the pigments within 100 nm-1000 nm after sedimentation. The steric stabilisation of the pigments is adapted to reduce agglomeration of the ink during sedimentation.

According to a first aspect of the disclosure a method of printing a digital a digital image on a substrate with at least one Piezo print head is provided. The method comprises:
  providing a water-based ink comprising an aqueous pigment mix comprising settling pigments, a binder comprising an acrylic resin dispersion, preferably a thermally crosslinkable acrylate copolymer dispersion, and a viscosity increasing substance comprising glycol and/or glycerine,
  providing a steric stabilisation of the pigments and adapting the size of the pigments and the viscosity of the water-based ink such that a settling velocity of the pigments exceeds about 0.001 mm/min at 25° C.,
  circulating said water-based ink within said at least one Piezo print head, and
  printing a digital image with said at least one Piezo print head by applying ink drops of said water-based ink on the substrate.

Preferably, the substrate is attached to a panel prior to printing.

The pigments may have an average diameter of about 200-500 nm and a diameter variation of the pigments may be within 100 nm-1000 nm for at least 90% of the pigments.

At least 90% of the pigments may have a diameter exceeding 250 nm. At least 90% of the pigments may have a diameter smaller than 800 nm.

The viscosity of the water-based ink may about 5-50 cps at 25° C., preferably about 10-30 cps at 25° C.

The digital image may be a wood design comprising a first and a second base colour and wherein at least one of the first and the second base colour is formed by water-based ink comprising the aqueous pigment mix.

The water-based ink may comprise a spot colour other than cyan, magenta, yellow and key (black). The spot colour may be applied as overlapping drops comprising a drop size of at least 30 picoliters. Preferably, the spot colour is not applied in a raster pattern but applied as overlapping drops.

The method may comprise a further step of applying heat and pressure to the substrate after printing.

The substrate may comprise a thermosetting resin. The thermosetting resin may be an amino resin such as melamine formaldehyde resin, urea formaldehyde resin, phenol formaldehyde resin, or a combination thereof. The substrate may be powder based. The substrate may be or comprise a paper.

The Piezo print head may comprise a nozzle opening with a diameter of at least 30 microns.

The settling velocity of the pigments may be 0.01-1 mm/min at 25° C.

Steric stabilisation may be obtained by adding an additive for steric stabilisation such as a dispersing agent to the water-based ink.

According to a second aspect of the disclosure water-based ink for digital printing on a substrate is provided, comprising
  an aqueous pigment mix comprising settling pigments, a binder comprising an acrylic resin dispersion, preferably a thermally crosslinkable acrylate copolymer dispersion, and a liquid viscosity increasing substance comprising glycol or glycerine,
  wherein the pigments are sterically stabilised,
  wherein the water-based ink comprises about 3-10 wt % of said pigments and about 5-20 wt % of said acrylic resin dispersion,
  wherein a settling velocity of the pigments exceeds 0.001 mm/min at 25° C., and
  wherein the viscosity of the water-based ink is about 5-50 cps at 25° C.

The substrate may be attached to a panel.

The pigments may have an average diameter of about 200-500 nm and a diameter variation of at least 90% of the pigments is within 100 nm-1000 nm.

At least 90% of the pigments may have a diameter exceeding 250 nm. At least 90% of the pigments may have a diameter smaller than 800 nm.

The liquid viscosity increasing substance may comprise at least 30 wt % of glycols and/or glycerine.

The liquid viscosity increasing substance may comprise ethylene glycol or propylene glycol or polyethylene glycol or diethylene glycol or butane diol.

The ink may further comprise a dispersing agent for steric stabilisation of the pigments.

After sedimentation of the ink, the ink may resume its original properties after being stirred.

The ink may comprise at least 30 wt % of de-ionised water.

The viscosity of the water-based ink may exceed 15 cps at 25° C.

The settling velocity of the pigments may be 0.01-1 mm/min at 25° C.

The pigments may be sterically stabilised by an additive for steric stabilisation such as a dispersing agent.

According to a third aspect of the disclosure a method of printing a digital image on a substrate with at least one Piezo print head is provided. The method comprising:
  providing a water-based ink comprising an aqueous pigment mix comprising pigments, a binder comprising an acrylic resin dispersion, preferably a thermally crosslinkable acrylate copolymer dispersion, and a viscosity increasing substance comprising glycol and/or glycerine,
  adapting the size of the pigments such that the average diameter of the pigments is about 200-500 nm and such that a diameter variation of at least 90% of the pigments is within 100 nm-1000 nm,
  circulating said water-based ink within said at least one Piezo print head, and
  printing a digital image with said at least one Piezo print head by applying ink drops of said water-based ink on the substrate.

Adapting the pigments may further comprise providing steric stabilisation of the pigments.

Preferably, the substrate is attached to a panel prior to printing.

The viscosity of the water-based ink may be about 5-50 cps at 25° C., preferably about 10-30 cps at 25° C.

At least 90% of the pigments may have a diameter exceeding 250 nm. At least 90% of the pigments may have a diameter smaller than 800 nm.

The digital image may be a wood design comprising a first and a second base colour and wherein at least one of the first and the second base colour is formed by said water-based ink comprising said aqueous pigment mix.

The water-based ink may comprise a spot colour other than cyan, magenta, yellow and key (black). The spot colour may be applied as overlapping drops comprising a drop size of at least 30 picoliters. Preferably, the spot colour is not applied in a raster pattern but applied as overlapping drops.

The method may further comprise applying heat and pressure to the substrate after printing.

The substrate may comprise a thermosetting resin. The thermosetting resin may be an amino resin such as melamine formaldehyde resin, urea formaldehyde resin, phenol formaldehyde resin, or a combination thereof. The substrate may be powder based. The substrate may be or comprise a paper.

The Piezo print head may comprise a nozzle opening with a diameter of at least 30 microns.

Providing steric stabilization of the pigments may comprises including a dispersing agent in the water-based ink.

According to a fourth aspect of the disclosure a water-based ink for digital printing on a substrate is provided, comprising an aqueous pigment mix comprising pigments with an average diameter of about 200-400 nm and with a pigment diameter variation of at least 90% of the pigments within 100 nm-1000 nm, a binder comprising an acrylic resin dispersion, preferably a thermally crosslinkable acrylate copolymer dispersion, and a liquid viscosity increasing substance comprising glycol or glycerine, wherein the water-based ink comprises about 3-10 wt % of said pigments and about 5-20 wt % of said acrylic resin dispersion, wherein the viscosity of the water-based ink is about 5-50 cps at 25° C.

The pigments may be sterically stabilised.

The substrate may be attached to a panel.

At least 90% of the pigments may have a diameter exceeding 250 nm. At least 90% of the pigments may have a diameter smaller than 800 nm.

The liquid viscosity increasing substance may comprise at least 30 wt % of glycols and/or glycerine.

The liquid viscosity increasing substance may comprise ethylene glycol or propylene glycol or polyethylene glycol or diethylene glycol or butane diol.

The ink may comprise at least 30 wt % of de-ionised water.

The viscosity of the water-based ink may exceed 15 cps at 25° C.

After sedimentation of the ink, the ink may resume its original properties after being stirred.

BRIEF DESCRIPTION OF THE DRAWINGS

The disclosure will in the following be described in connection to embodiments and in greater detail with reference to the appended exemplary drawings, wherein, FIGS. 1a-1d Illustrate settling of pigments in a liquid pigment mix.

FIGS. 4a-4b Illustrate digital printing with a Piezo head equipped with an ink circulation system.

DETAILED DESCRIPTION

Embodiments of the disclosure are based on a main principle where copies of natural materials such as wood and stone may be made in several steps and with a digital water-based technology that may provide a high quality print, in spite of the fact that high resolution digital printing with small pigments is not used to apply the major part of the required pigments of the décor. The disclosure is not limited to water-based inks and the main principles may be used in other print types, especially UV curable inks.

Pigments are according to the first principle of the disclosure applied with a Piezo print head that applies a pigment mix comprising large pigments and not a stable pigment dispersion comprising very small and well defined pigments.

Pigments mixed with a fluid, for example, water, settle due to gravity to the bottom and form sediments. Such pigment mix comprising unstable pigment dispersions is not used in conventional print heads that apply a water-based ink.

Figure 1A:
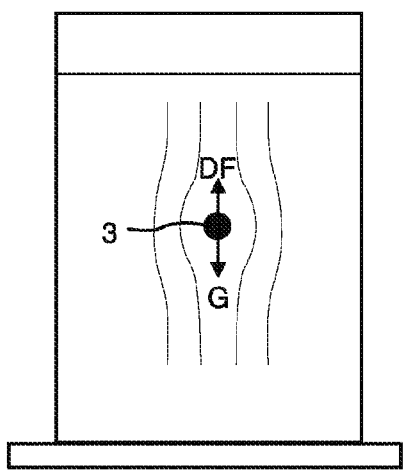

FIG. 1a shows that there are two main forces acting upon the pigments 3 in a liquid pigment mix-gravity G and a drag force DF due to the motion of the particle through a fluid. The drag force DF is a function of the particle velocity. When a pigment particle accelerates due to gravity, the drag force DF acts in the opposite direction. The particle increases its velocity and the drag force increases until the gravity G and the drag force DF are equal. This velocity is known as settling velocity and is dependent upon the size, the shape and the density of the pigments as well as upon the viscosity and density of the fluid. In this disclosure, the settling velocity is measured at 25° C.

Figure 1B:
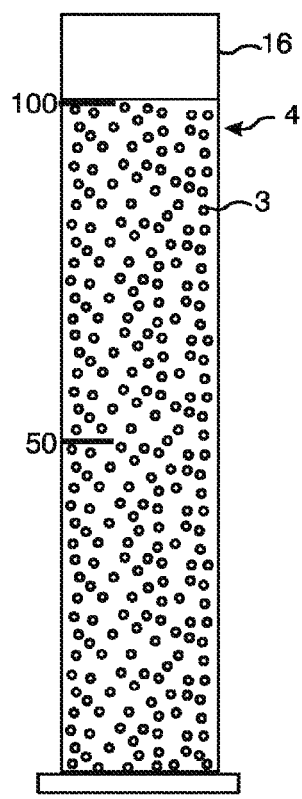

FIG. 1b shows a pigment dispersion 4 for digital inks in a 100 mm high test tube 16 where the pigments 3 are dispersed in a fluid in a stable dispersion such that no settling takes place even after several weeks or months.

Figure 1C:
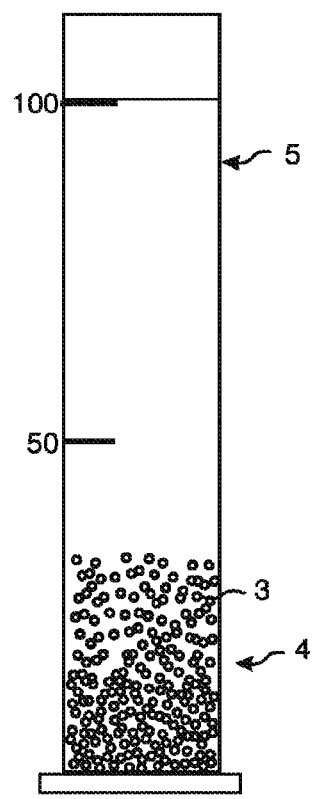

FIG. 1c shows an example of a pigment mix 5 where the fluid is 100% water with a viscosity of 1 cps. The pigments 3 are, in this example, conventional black iron oxides pigments BK 5525 used in paints with an average size of about 0.8 microns (800 nm) and a density of 4.7 g/cm3 mixed by a dissolving device such that agglomerates have been separated into primary particles with different sizes. The largest pigments are settling with a high settling velocity of about 50 mm/min. All large pigments have settled after only 2 minutes and they form a slurry on the bottom of the test tube.

Figure 1D:
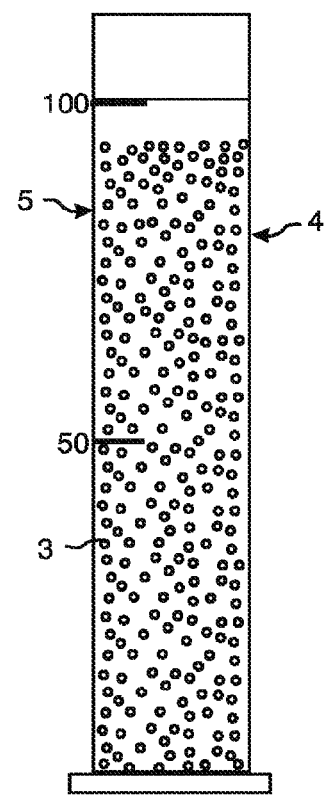

FIG. 1d shows the same pigments in a pigment mix where the fluid is 100% propylene glycol with a viscosity of 50 cps at 25° C. and a density of 1.04 g/cm3. The pigments fall very slowly with a settling velocity of about 0.2 mm per minute and only 12% of the pigments have settled after 1 hour.

Propylene glycol was mixed with water and pigments and settling velocities of different pigments with different average sizes of 0.1-1.0 microns were measured at viscosities of 5-50 cps. The settling viscosity of the pigments varied between 0.01-25 mm/min. Small pigments had a lower settling velocity than larger pigments at all viscosities. All pigments had a lower settling velocity when the viscosity was increased.

Figure 2A:
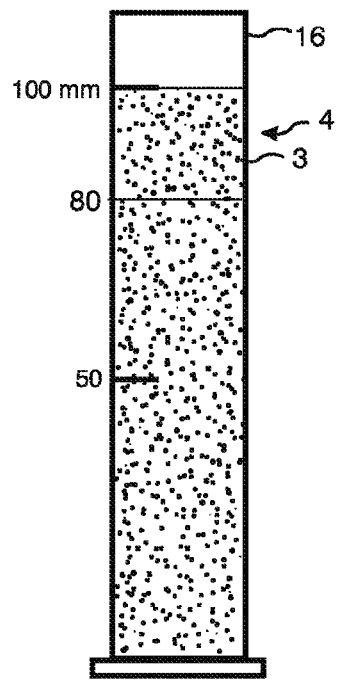
FIGS. 2a-2d Illustrate pigment size in a high quality water-based ink.
Figure 2B:
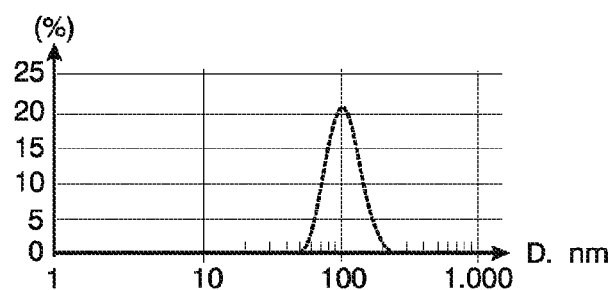

The stability of an ink-jet ink and the settling velocity of pigments in the ink may be accurately measured with a Malvern Zetasizer instrument that measures particle and molecule size from one nanometer to several microns using dynamic light scattering. FIG. 2a shows water-based high quality ink-jet ink, which is used in industrial digital printing. The ink was carefully stirred and poured in a 100 mm pipe and the particle size was measured with a Malvern Zetasizer. FIG. 2b shows that the pigments in the ink suspension had an average diameter of 102 nm and the diameter or the size varied in the ink from 50-250 nm.

Figure 2C:
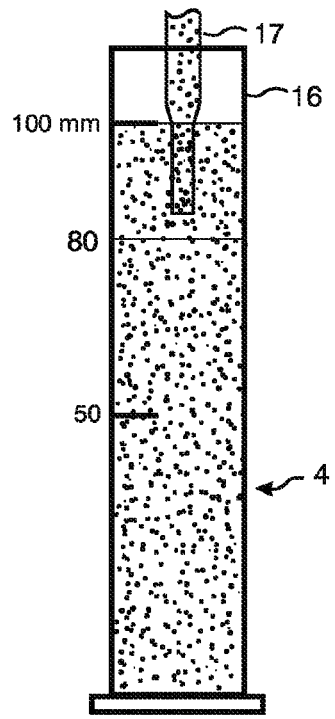
Figure 2D:
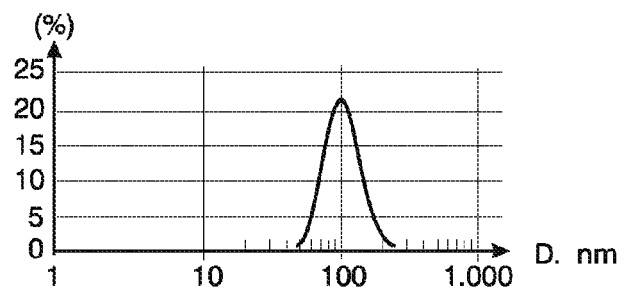

A new measurement was made of an ink sample, which was taken 48 hour later about 20 mm below the upper ink surface as shown in FIGS. 2c and 2d. The average particle size and the particle distribution were practically identical. The same measurement was made after 7 days 10 mm below the surface and the result was the same. This means that even the largest particles have not fallen 10 mm during 7 days and the settling speed was less than 10 mm per 168 hours or less than 0.001 mm per minute. The ink suspension was a stable suspension and measurements confirmed that this ink suspension comprised pigments with a settling velocity of less than 0.0001 mm/min or less than 1 mm/7 days.

Figure 3A:
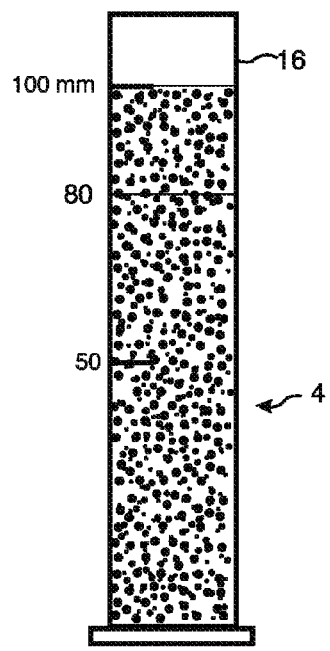
FIGS. 3a-3d Illustrate settling of pigments in a liquid pigment mix.
Figure 3B:
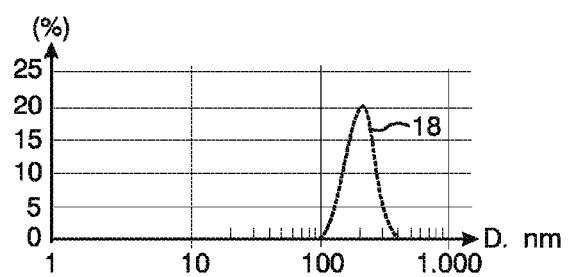
Figure 3C:
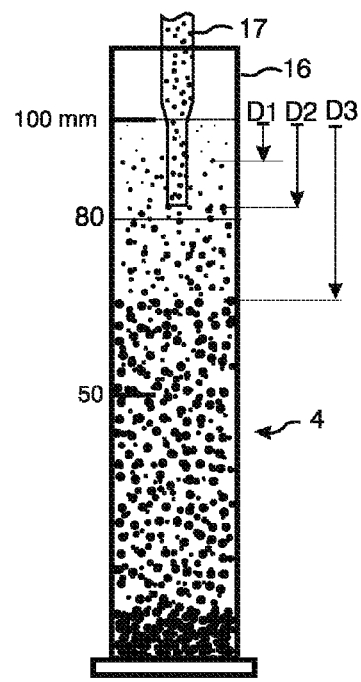
Figure 3D:
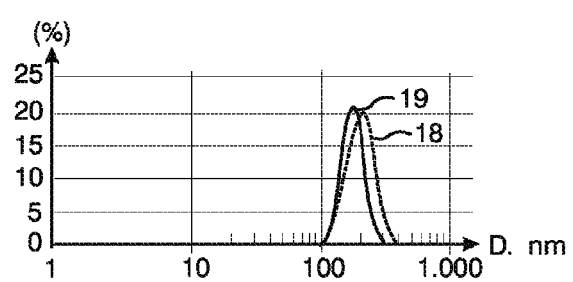
Figure 5A:
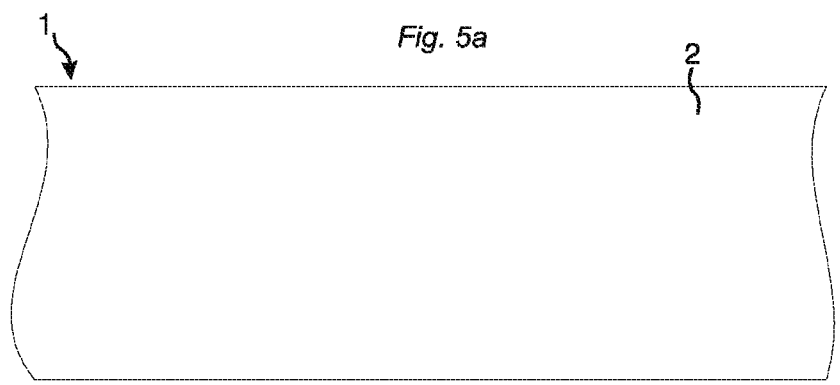
FIGS. 5a-5d Illustrate digital printing of a wood design.
Figure 5B:
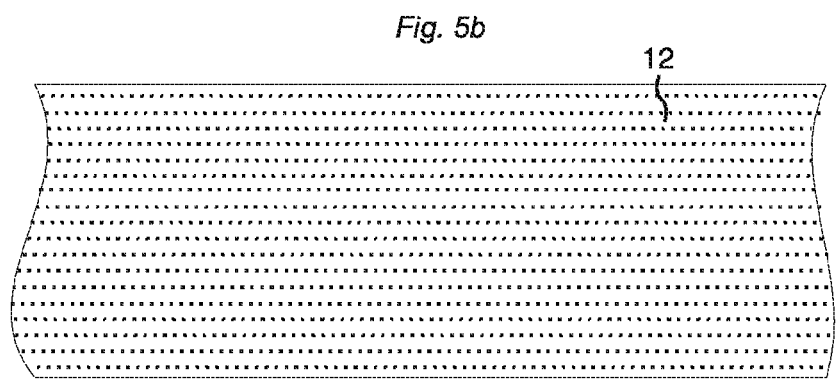
Figure 5C:
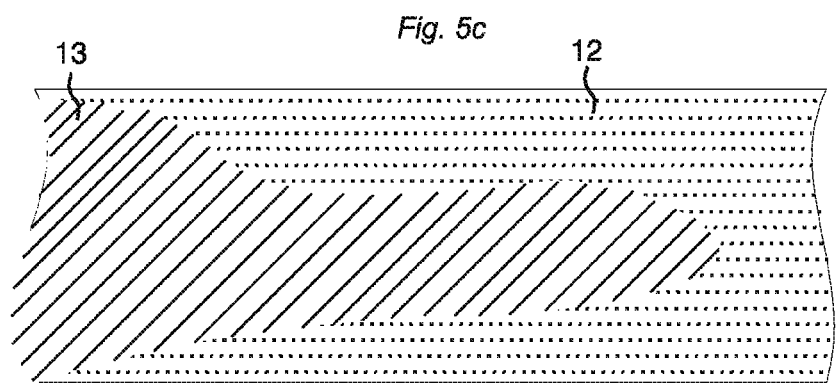
Figure 5D:
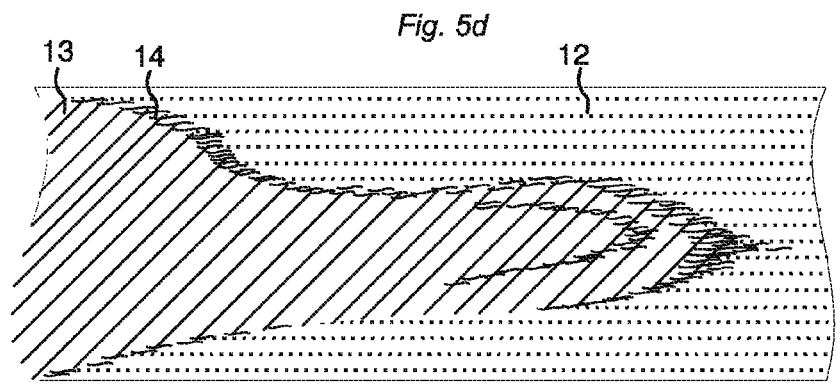

FIGS. 3a-3d show similar measures for an ink mix suspension comprising rather large soft settling pigments that have not been modified such that they form a stable pigment dispersion 4. The stirred ink mix suspension comprised pigments with an average diameter of 204 nm and the particle diameter in the suspension varied from 100-400 nm for almost all particles, for example for 90% of the particles, in the suspension as shown by the first graph 18 in FIG. 3b. Measurements show that all suspensions may comprise small fractions of extremely small particles or some large particles. Such small fractions should be disregarded in measurements of particle distribution. FIGS. 3c and 3d show a measurement of a sample 17 of the ink mix suspension 20 mm below the surface after 48 hours. The particle distribution is shown by the second graph 19 in FIG. 3d. Small pigments have fallen with a distance D1 of about 10 mm, medium sized pigments have fallen with a distance D2 of almost 20 mm and all larger pigments have fallen with a distance D3 that exceeds 20 mm. The graph 19 in FIG. 3d shows that the average diameter size has decreased from 204 nm to 150 nm and that the particle diameter size in the sample varies from about 100 nm to about 300 nm. The conclusion is that the largest particles have fallen at least 20 mm and that the settling speed exceeds 0.007 mm/min or about 0.01 mm/min.

Embodiments of the disclosure are based on a first principle that ink-jet ink preferably for flooring applications there preferably spot colours are used may be produced with a well-defined particle size that is larger than the particle size of pigments used in known industrial ink-jet inks and with a controlled settling velocity of the pigments. Such ink may be adapted to the nozzle size of the print heads and the capacity of the ink circulation system of the flat bed single pass printer. Such specific combinations of ink, print heads and ink circulation systems may be used to reduce the cost of the digital print especially when copies of natural materials such as wood and stone designs are formed on a panel material. The production cost of the ink is to a large extent directly related to the size and settling velocity of the pigments. Very cost efficient inks may be produced with a cost that is a fraction of the present ink-jet ink costs if unstable ink suspensions comprising larger pigments with increased settling velocity may be used in the printing system.

A preferred formulation for a pigment mix that is suitable for a Piezo print head with an ink circulation system is a fluid having a viscosity of 5-30 cps and comprising pigments 3 with an average diameter of about 200-500 nm and preferably a particle distribution where the major part of the pigments mix, preferably at least 90% of the particles, comprise particles having a minimum particle diameter of at least 100 nm and a maximum particle diameter of 1000 nm or less. The pigments in the mix have preferably a settling velocity of 0.01-1.0 mm/min at 25° C.

Such an ink mix suspension comprising soft settling pigments may preferably also be characterized in that the upper 20 mm of an ink mix suspension in a 100 mm high container 16 after 48 hours comprises pigments with an average diameter or size that is at least 10% lower than the average pigment diameter or size of the pigments in the ink immediately after stirring or shaking of the ink in the container.

The ink mix suspension comprising soft settling pigments may preferably also be characterized in that the upper 20 mm of an ink mix suspension in a 100 mm high container 16 after 48 hours comprises pigments with a diameter that is at least 10% smaller than the largest diameter of the pigments in the ink immediately after stirring or shaking of the ink in the container.

Smaller pigments with an average size of 100-200 nm may also be used but such pigments are more expensive due to the additional milling, which generally is required to reduce the particle size.

Embodiments of the disclosure are based on a second principle wherein the pigment dispersion comprises considerably larger pigments then the pigments used in known water-based inks, as described above and that such large pigments are stabilized by means of a simple steric stabilization. The settling velocity may be reduced considerably with marginal additional costs to, for example, a 0.001-0.01 mm/min if a dissolving device is used to break down the pigment material to individual pigments and if the pigments during the break down in the dissolving device are mixed with a proper amount of an additive for steric stabilisation such as a suitable dispersing agent that prevents the individual pigments to agglomerate and that provides a steric stabilization. An example of such suitable dispersing agent is Disperbyk 190, a high molecular weight block copolymer with pigment affinity groups.

FIG. 4*a* shows schematically a nozzle 8 of a print head that comprises an ink circulation system with an ink inlet 10 and an ink outlet 11. The ink circulates above and in the nozzle opening 9. A Piezo crystal 7 generates a pressure pulse and an ink drop 6 is ejected through the nozzle opening 9 and applied on a substrate 2 that preferably is an upper part of a panel 1. The ink circulation system is contrary to known technology not primary used to prevent that the ink dries in the nozzle opening since this may be accomplished with a water based ink comprising a rather high glycol content, for example, 30 wt % or more. The ink circulation system according to the invention is mainly used to prevent pigment sedimentation in the printer. The ink circulation system may comprise an ink container with a mixer that maintains the pigments in a floating stage and several filters (e.g., 1-5 filters) that remove agglomerates. The mixer comprises preferably a mechanical mixing device that rotates with a low speed, such as less than 1000 rpm. The ink circulation system preferably comprises one or several pumps for pumping the ink through the print heads. The ink is preferably circulated from a level close to but above the bottom surface of the ink container such that sediments of pigments may be accumulated at the bottom of the ink container. Preferably, ink that is delivered to the printer is stirred in a controlled way prior to printing such that sedimentation during transport is at least reduced.

The water-based ink is preferably configured such that the ink resumes its original structure and pigment distribution even after several sedimentations by stirring the ink. The steric stabilisation is configured to prevent, or at least reduce, agglomeration of the ink after sedimentation. Even after several sedimentations, the ink is configured such that the pigments may have an average diameter of about 200-500 nm and a diameter variation of at least 90% of the pigments within 100 nm-1000 nm. Preferably, all other properties of the water-based ink described in this disclosure are maintained after sedimentation by stirring the ink.

FIG. 4*b* shows that the pigment mix 5 after ejection is drawn back into the nozzle opening 9 by vacuum and surface tension and the whole pigment mix is circulated in the system.

The nozzle opening 9 may be 30 microns or larger and such print head may eject rather large drops of 30-50 picoliters and may handle pigments with an average diameter of up to about 500 nm and with a part of the pigments having a diameter of 1000 nm. A print head designed for a viscosity of 10-12 cps may generally handle viscosities up to 30 cps with somewhat lower drop velocities.

An ink comprising a pigment mix may be solvent, oil or UV based but water-based ink is preferred. A preferred ink may comprise:
- an aqueous pigment mix comprising pigments,
- a binder comprising an aqueous dispersion of an acrylic resin, preferably a thermally crosslinkable acrylate copolymer dispersion,
- glycol or glycerine preferably mixed with water as viscosity increasing substance.

The pigment mix is preferably produced in two steps. The first step comprises a high speed mixing, with a dissolving device, of the pigments in a liquid with low viscosity such as, for example, water mixed with wetting agents. The pigment particles are wetted and the high speed mixing causes a spontaneous break down of the pigment agglomerates into individual particles. A dispersing agent may be used when the pigment are broken down in the dissolving device to individual pigment particles. Smaller amounts of a dispersing agent for steric stabilisation, such as, for example, 3-5 wt % of Disperbyk 190 may be used to reduce the settling velocity to a level of about 0.01 m/min. Larger amounts, for example 10-50 wt %, of a suitable dispersing may reduce the settling velocity of large pigments and a practically stable pigment dispersion may be obtained with a settling velocity of 0.001 mm/min or even lower. This basic pigment mix is thereafter mixed in one or several steps with the acrylic binder and the viscosity increasing substance in order to obtain an ink with large pigments that have a suitable settling velocity adapted to an ink circulation system and the type of print heads that are used. The pigment size may be reduced further prior or after mixing in a ball mill.

The acrylic resin may be an acrylic or methacrylic binder. The acrylic resin may be a homopolymer or a copolymer of two or more monomers. Such a monomer may have a specific functionalization such as hydroxy, carboxy, epoxy, etc. A preferred acrylic binder is an aqueous anionic polymer dispersion such as Helizarin binder produced by BASF.

A preferred material composition of the ink, based on weight (wt %), is about 3-10 wt % pigments with an average diameter size exceeding 200 nm, about 10 wt % acrylic dispersion and about 80 wt % of water and viscosity increasing substance as described above. The mix may vary and preferred inks may have a composition of 245 wt % pigments and 5-20 wt % acrylic dispersion.

The viscosity increasing substance may, for example, comprise water-soluble polyethylene glycol (PEG) that is compatible with melamine resins and allows easy and fast curing when heat, and preferably also pressure, is applied. A preferred solvent that is compatible with thermosetting resins should be miscible with water, have a boiling point above 100° C. and a melting point lower than the application temperature. Examples of such, but not restricted to, are ethylene glycol, propylene glycol, polyethylene glycol, diethylene glycol, butane diol and glycerine. Combinations may also be used.

All ink formulations may comprise small amounts, about 1-2%, of wetting agents such as, for example, BYK or Surfinol and chemicals such as Actidice intended for control of bacteria and fungi.

Such inks with a pigment mix comprising large pigments are very cost efficient. The high viscosity will create high drag forces and the pigments will be circulated by the ink circulation system such that practically no sedimentation occurs in the system.

It is an advantage if the print head is in frequent operation. Drop ejections may be made between panels and the print head may eject drops in a cupping station when the printer is not in use. The ink in the cupping station may be recycled.

A high glycol content will increase the so-called "decap time," or the time that an ink is in liquid form in the nozzle opening, to several hours and no clogging of the nozzles will take place even if the print head is uncapped and not operational.

FIGS. 5a-5d shows forming of a digital print on a substrate 2 forming part of a panel 1. The substrate 2 may comprise wood, paper, a thermoplastic material such as a thermoplastic foil, a powder based layer, etc. The substrate 2 is preferably attached to the panel 1 prior to printing. The panel 1 comprises a core. The print is a wood décor comprising a first base colour 12 that is used to cover the core of the panel such that the colour of the core is not visible in the final décor. The first base colour may also be used to provide the main colour of the wood décor. Several other colours are used to form the specific wood grain structure. The first base colour 12 may be formed in several alternative ways. It may be applied on the core of the panel 1 with rollers as a base coating. It may be a coloured paper or a foil applied on the core of the panel 1. It may also be a powder layer applied on the core of the panel 1 prior to printing. The powder layer may comprise wood fibres, a thermosetting resin and pigments. Base colours that are used to cover the colour of the core are not formed with conventional digital inks since a large amount of pigments would be needed to cover the colour of the core, especially if HDF is used the generally is difficult to cover with a base colour. The base colour is preferably according to the disclosure contrary to known technology formed digitally with ink comprising a pigment mix. Cost efficient ink comprising large pigments is very suitable to form a base colour since a large amount of pigments may be used. A powder layer of a WFF floor comprising pigments as described above must be rather thick to cover the core. Generally about 400 g/m2 is needed. The powder layer may be reduced considerably to about 200 g/m2 if a digital print with a spot colour comprising large pigments is applied on the core under the powder or on the powder. The first base colour 12 may be a combination of a powder layer and a digital print that increases the colour intensity such that the pigment content in the powder and in the ink is sufficient to cover the colour of the core of the panel.

A combination of a powder layer comprising a thermosetting resin and ink comprising large pigments provides the advantage that the ink preferably may be binder free since the ink drops are bonded into the powder by the thermosetting resin when heat and pressure is applied during the final lamination step. This may provide additional cost advantages.

A second base colour 13 may be applied with ink comprising a pigment mix of large pigments. The first and the second colour provide generally more than 80% of the pigments which are needed to form a wood or stone design. The two colours may be applied with rather low resolution and no "photo quality" is needed to form the basic colours of a wood design. A pigment mix comprising large pigments is very suitable to form spot colours in a cost effective way. A major advantage is that the spot colours may be applied as large overlapping ink drops comprising a drop size of 30 picoliters or larger. Preferably, the spot colour is not applied in a raster pattern but applied as overlapping drops. A print head may be used to "paint" surface portions with overlapping drops applied in a continuous layer. The large pigments are less sensible to bleeding, especially when the printed surface layer comprises thermosetting resins that are cured under high heat and pressure.

The remaining décor colours 14 that provide a specific high definition wood grain structures, grey scales or shadings may be applied with a traditional printing method comprising a stable pigment dispersion of small pigments. A preferred digital print for forming a wood décor is characterised in that at least about 80% of the pigments are applied with an ink comprising a pigment mix of large pigments and/or soft settling large pigment as described above.

It is also contemplated that the present disclosure may be combined and used with other types of print heads than Piezo print head.

Example 1

A dispersion container of a dissolving device (Dispermat CV3-Plus) was filled with 80 wt % water, 15 wt % carbon black pigments (Printex 60) and 5 wt % of a dispersing agent (Disperbyk 190). The dissolving device dispersed the mix during 10 minutes at 8000 rpm and a pigment dispersion was obtained. 70 g of the pigment dispersion was thereafter mixed with 100 g water, 100 g polyethylene glycol PEG 400 and 30 g acrylic binder (Helisarin ET 95). 300 g of an ink mix suspension was obtained comprising 10.5 g or 3 wt % of dispersed carbon black pigments. The ink mix suspension was filtered with a 0.5 micron filter. The viscosity was measured to 10 mPa·s. The size of the pigments was immediately after the mixing measured with a Zetasizer. The diameter of the pigments varied from about 100 nm to about 400 nm and the average diameter was about 200 nm. A sample of an upper part of the ink 20 mm below the ink surface was taken after 2 days (48 hours). The average size and the variation of the particles size were practically unchanged. The average size and the size of the largest particles decreased after 4 days. The settling velocity of the largest pigments was lower than 0.01 mm/min and higher than 0.003 mm/min. A rather stable ink comprising large unmilled pigments was obtained in a simple way. One channel of a single pass printer comprising a Fuji Piezo print head with a nozzle opening of 30 micron and an ink circulation system at nozzle level was used to provide a spot colour on a powder layer applied on a HDF core. The spot colour was applied with large overlapping drops with a drop size of about 30-50 picoliters and a wood grain structure was formed on a powder comprising a mix of wood fibres, melamine formaldehyde resin particles, brown pigments and aluminium oxide particles. The print and the powder layer were cured under heat and pressure in a lamination press comprising an embossed press plate with an embossing in register with the wood grain structure. A high quality wood design without visible bleeding or pigment floating was formed on the panel with a brown base colour and black wood grain structure in register with the embossed surface.

Example 2

A dispersion container of a dissolving device (Dispermat CV3-Plus) was filled with 50 wt % water, 40 wt % titanium dioxide pigments and 10 wt % of a dispersing agent (Disperbyk 190). The dissolving device dispersed the mix during 10 minutes at 8500 rpm and a pigment dispersion was obtained. 90 g of the pigment dispersion was thereafter mixed with 90 g water, 60 g glycerine, 30 g diethylene glycol and 30 g acrylic binder (Helisarin ET 95). 300 g of an ink mix suspension was obtained comprising 36 g or 12 wt % of dispersed pigments. The ink mix suspension was filtered with a 1.0 micron filter. The viscosity was measured to 15 mPa·s. The size of the pigments was immediately after the mixing measured with a Zetasizer. The diameter of the pigments varied from about 100 nm to about 1000 nm and the average diameter was 418 nm. A sample of an upper part of the ink 20 mm below the ink surface was taken after 2 days (48 hours). The average size and the variation of the particles size were practically unchanged. The average size and the size of the largest particles decreased after 3 days. The settling velocity of the largest pigments was lower than 0.01 mm/min and higher than 0.005 mm/min. One channel of a single pass printer comprising a Fuji piezo print head with a nozzle opening of 30 micron and an ink circulation system at nozzle level was used to provide a spot colour on a thin powder layer (200 g/m2) applied on a HDF core. The powder was a mix of wood fibres, melamine formaldehyde resin particles and titanium dioxide pigments. The spot colour was applied on essentially the whole surface with large overlapping drops with a drop size of about 50 picoliters. The print and the powder layer were cured under heat and pressure in a lamination press and a high quality white base colour was formed that covered the brown colour of the HDF core.

The invention claimed is:
1. A method of printing a digital image on a substrate attached to a panel with at least one Piezo print head, the method comprising:
   providing a water-based ink comprising:
      an aqueous pigment mix comprising pigments,
      a binder comprising an acrylic resin dispersion and
      a viscosity increasing substance comprising glycol and/or glycerine,
   providing a steric stabilisation of the pigments and adapting the size of the pigments and the viscosity of the water-based ink such that a settling velocity of the pigments exceeds about 0.001 mm/min at 25° C.,
   circulating said water-based ink within said at least one Piezo print head, and
   printing a digital image with said at least one Piezo print head by applying ink drops of said water-based ink on the substrate.
2. The method as claimed in claim 1, wherein the pigments have an average diameter of about 200-500 nm and a diameter variation of at least 90% of the pigments is within 100 nm-1000 nm.
3. The method as claimed in claim 1, wherein at least 90% of the pigments have a diameter exceeding 250 nm.
4. The method as claimed in claim 1, wherein at least 90% of the pigments have a diameter smaller than 800 nm.
5. The method as claimed in claim 1, wherein the viscosity of the water-based ink is about 5-50 cps at 25° C.
6. The method as claimed in claim 1, wherein the digital image is a wood design comprising a first and a second base colour, and wherein at least one of the first and second base colour is formed by said water-based ink comprising said aqueous pigment mix.
7. The method as claimed in claim 1, wherein the water-based ink comprises a spot colour.
8. The method as claimed in claim 7, wherein the spot colour is applied as overlapping drops comprising a drop size of at least 30 picoliters.
9. The method as claimed in claim 1, further comprising applying heat and pressure to the substrate after printing.
10. The method as claimed in claim 1, wherein the substrate comprises a thermosetting resin.
11. The method as claimed in claim 1, wherein the substrate is powder based.
12. The method as claimed in claim 1, wherein the substrate comprises a paper.
13. The method as claimed in claim 1, wherein the Piezo print head comprises a nozzle opening with a diameter of at least 30 microns.
14. The method as claimed in claim 1, wherein settling velocity of the pigments is 0.01-1 mm/min at 25° C.
15. The method as claimed in claim 1, wherein providing steric stabilization of the pigments comprises including a dispersing agent in the water-based ink.
16. The method as claimed in claim 1, wherein the viscosity increasing substance comprises at least 30 wt % of glycol and/or glycerine.
17. A method of printing a digital image on a substrate attached to a panel with at least one Piezo print head, the method comprising:
   providing a water-based ink comprising:
      an aqueous pigment mix comprising pigments,
      a binder comprising an acrylic resin dispersion, and a viscosity increasing substance comprising glycol and/or glycerine, adapting the size of the pigments such that the average diameter of the pigments is about 200-500 nm and such that a diameter variation of at least 90% of the pigments is within 100 nm-1000 nm and providing a steric stabilisation of the pigments, circulating said water-based ink within said at least one Piezo print head, and printing a digital image with said at least one Piezo print head by applying ink drops of said water-based ink on the substrate.

18. The method as claimed in claim 17, wherein the viscosity of the water-based ink is about 5-50 cps at 25° C.

19. The method as claimed in claim 17, wherein at least 90% of the pigments have a diameter exceeding 250 nm.

20. The method as claimed in claim 17, wherein at least 90% of the pigments have a diameter smaller than 800 nm.

21. The method as claimed in claim 17, wherein the digital image is a wood design comprising a first and a second base colour, and wherein at least one of the first and the second base colour is formed by said water-based ink comprising said aqueous pigment mix.

22. The method as claimed in claim 17, wherein the water-based ink comprises a spot colour.

23. The method as claimed in claim 22, wherein the spot colour is applied as overlapping drops comprising a drop size of at least 30 picoliters.

24. The method as claimed in claim 17, further comprising applying heat and pressure to the substrate after printing.

25. The method as claimed in claim 17, wherein the substrate comprises a thermosetting resin.

26. The method as claimed in claim 17, wherein the substrate is powder based.

27. The method as claimed in claim 17, wherein the substrate comprises a paper.

28. The method as claimed in claim 17, wherein the Piezo print head comprises a nozzle opening with a diameter of at least 30 microns.

29. The method as claimed in claim 17, wherein providing steric stabilization of the pigments comprises including a dispersing agent in the water-based ink.

30. The method as claimed in claim 17, wherein the viscosity increasing substance comprises at least 30 wt % of glycol and/or glycerine.

* * * * *